(12) United States Patent
Yamada

(10) Patent No.: US 6,887,608 B2
(45) Date of Patent: May 3, 2005

(54) FUEL CELL SYSTEM AND RELATED OPERATING METHOD

(75) Inventor: Kazuhiro Yamada, Miura (JP)

(73) Assignee: Nissan Motor Co., Ltd., Yokohama (JP)

( * ) Notice: Subject to any disclaimer, the term of this patent is extended or adjusted under 35 U.S.C. 154(b) by 50 days.

(21) Appl. No.: 10/642,150

(22) Filed: Aug. 18, 2003

(65) Prior Publication Data
US 2004/0048124 A1 Mar. 11, 2004

(30) Foreign Application Priority Data
Sep. 6, 2002 (JP) ........................................ 2002-262003

(51) Int. Cl.[7] .............................. H01M 8/04; H01M 8/00
(52) U.S. Cl. ........................................... 429/26; 429/13
(58) Field of Search .............................. 429/12, 13, 26; 165/146, 147, 159–163, 169, 171; 137/340

(56) References Cited

FOREIGN PATENT DOCUMENTS

JP 2000-149970 A 5/2000

Primary Examiner—Patrick Joseph Ryan
Assistant Examiner—Melissa Austin
(74) Attorney, Agent, or Firm—Foley & Lardner LLP

(57) ABSTRACT

A fuel cell system and related operating method are disclosed wherein a water storage section (a water storage tank 33), that stores water to humidify a fuel cell 1, is provided with a heat transfer surface (52a to 55a, 52b to 54b) that is heated by hot medium supplied to a hot medium flow passage. The heat transfer surface is inclined such that a surface area surrounded by the heat transfer surface increases as a water level increases. Antifreeze solution forming coolant medium of the fuel cell is heated and used as hot medium of the hot medium flow passage.

11 Claims, 7 Drawing Sheets

FUEL CELL SYSTEM AND RELATED OPERATING METHOD

BACKGROUND OF THE INVENTION

The present invention relates to fuel cell systems equipped with humidification type fuel cells and fuel cell operating methods and, more particularly, to an improvement over a thawing mechanism for thawing water during occurrence of water, for humidification, being frozen.

As a measure to address issues of environmental problems in recent years, especially global environmental problems caused air pollutions and carbon dioxide emissions resulting from exhaust gas emissions of automobiles, fuel cell are attracting public attention as useful technologies to provide a capability of exhausting clean exhaust gases while having a high energy efficiency. The fuel cell is an energy conversion system that is comprised of an electrolyte/electrode catalytic composite body adapted to be supplied with reformed gas, with hydrogen or hydrogen rich gas as fuel, and air to allow electrochemical reaction take place to convert a chemical energy to an electrical energy. Among these, a solid polymer electrolyte type fuel cell employing a solid polymer membrane as the electrolyte is cost effective and easy to be configured in compact and has a high power output density and, therefore, is highly expected to be applied to the automobiles as moving object power supplies thereof.

By the way, with the above-described solid polymer electrolyte type fuel cell, the solid polymer membrane is subjected to saturated water and has a function as an ion conductive electrolyte while having a function to separate hydrogen and oxygen from one another. If the amount of saturated water of the solid polymer membrane is in short, ion resistance increases to cause hydrogen and oxygen to be mixed to cause inability of the fuel cell to generate the electric power output.

Meanwhile, if hydrogen ions separated from a hydrogen electrode permeates through the electrolyte membrane, water also moves together with hydrogen ions, causing a tendency in which the hydrogen electrode is dried. Further, if the ratio of steam contained in hydrogen and air that are supplied is small, the solid polymer membrane has areas, close proximity to respective reaction gas inlets, that tend to be dried.

Because of these reasons, there is a need for the solid polymer membrane of the solid polymer electrolyte type fuel cell to be supplied with moisture from an outside to allow the same to be positively humidified and, to this end, some humidifying means is included for humidifying hydrogen and air that are supplied.

In the humidifying means of the solid polymer electrolyte type fuel cell, a measure is required to be taken for freezing of humidification water in consideration of the fuel cell being used in a cold district. In a case where the solid polymer electrolyte type fuel cell is used as a power supply of an electric vehicle, if humidification water is frozen during use in a cold district, a difficulty is encountered in smooth start-up.

To solve such issues, Japanese Application Laid-Open No. 2000-149970 discloses a technology wherein a coolant delivery pipe of a fuel cell is disposed adjacent a water tank that stores water for humidification to heat the water tank by heated coolant liquid when in start-up during a freezing state for thereby thawing frozen water in the water tank.

SUMMARY OF THE INVENTION

However, with such a mere configuration in which the coolant delivery pipe is simply disposed adjacent the water tank as contemplated in the technology set forth above, a heat transfer surface is hard to be widened with a resultant issue arising in an inability of an adequate thawing performance. In order for the heating transfer surface to be widened using such a method, although the water tank may be largely sized, it is hard to comply with the need through the large size configuration of the water tank especially in a case where the fuel cell system is miniaturized for application to the vehicle.

It is, therefore, an object of the present invention to provide a fuel cell system and related operating method which, even when a water tank is miniaturized, enables a sufficient thawing performance to be obtained and enables smooth start-up to be realized even in a cold district.

A first aspect of the present invention is a fuel cell system which comprises a fuel cell, a fuel cell humidifier having a water storage section that stores water to humidify the fuel cell, and a heat transfer surface disposed in the water storage section and heated by hot medium supplied to a hot medium flow passage, wherein the heat transfer surface having an inclination angle that allows a surface area of a water level surrounded by the heat transfer surface to progressively increase with an increase in a water level.

A second aspect of the present invention is a method of operating a fuel cell system, which method comprises preparing a fuel cell, preparing a fuel cell humidifier having a water storage section that stores water, preparing a hot medium flow passage formed with a heat transfer surface, disposed in the water storage section, which has an inclination angle that allows a surface area of a water level surrounded by the heat transfer surface to progressively increase with an increase in a water level, supplying hot medium through the hot medium flow passage and heating the water in the water storage section, and humidifying the fuel cell using the water heated by the heat transfer surface, and supplying fuel and oxidizer to the fuel cell to allow the fuel cell to generate an electric power output in the presence of the water supplied thereto in the humidifying step.

DETAILED DESCRIPTION OF THE PREFERRED EMBODIMENS

Hereinafter, a fuel cell system to which the present invention is applied is described in detail with reference to the attached drawings.

(First Embodiment)

This embodiment features a fuel cell system of the present invention which is applied to an electric vehicle power generation system that is used as a drive source of an electric vehicle powered by a fuel cell.

Figure 1:
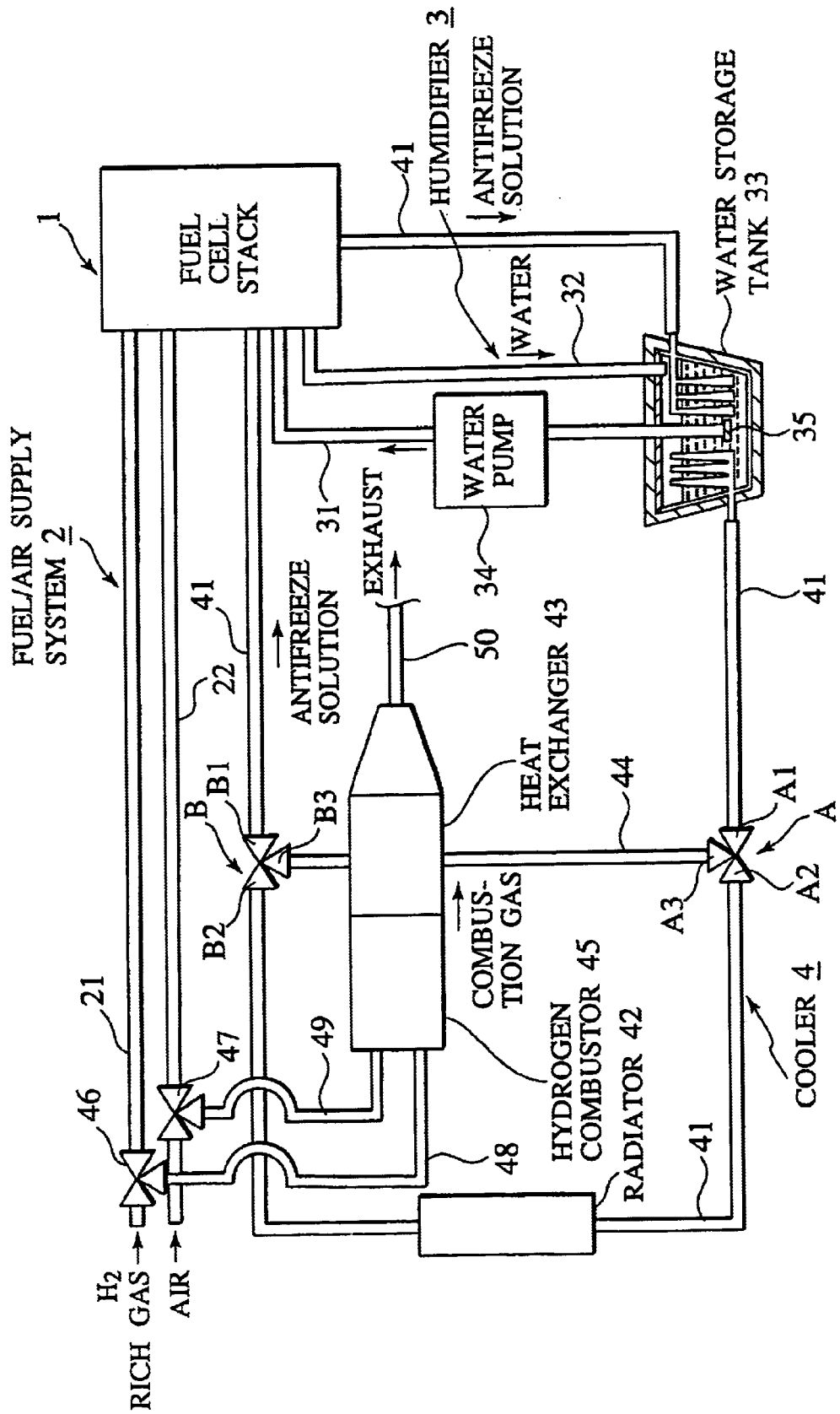
FIG. 1 is an overall structural view showing an example of an electric vehicle power generation system to which the present invention is applied.

FIG. 1 shows an overall electric vehicle power generation system. The electric vehicle power generation system is broadly comprised of a fuel cell stack 1 serving as the drive source of the electric vehicle, a fuel/air supply system 2 that supplies hydrogen (or hydrogen rich gas) as fuel and oxidizer (air) to the fuel cell stack 1, a humidifier 3 serving as a humidifying means to supply water to the fuel cell stack 1 for humidification, and a cooler 4 serving as a cooling means for cooling the fuel cell stack 1.

The fuel cell stack 1 has a structure that includes multiple stages of stacked electric power generating cells, each of which is comprised of a fuel electrode, adapted to be supplied with hydrogen, and an air electrode, adapted to be supplied with oxygen (air), between which an electrolyte/electrode catalytic composite body is sandwiched, with a chemical energy being converted into an electric energy through electrochemical reaction. With the fuel electrode being supplied with fuel, hydrogen ions and electrons are dissociated from one another and hydrogen ions pass through the electrolyte and electrons pass through an external circuitry to generate an electric power output to transfer to the air electrode, respectively. Also, on the air electrode, oxygen, contained in air that is supplied, and the hydrogen ions and the electrons react one another to create water that is expelled to the outside.

As the electrolyte of the fuel cell stack 1, a solid polymer electrolyte is employed in view of achieving a high energy density, a low cost and a light weight. The solid polymer electrolyte is composed of a polymer membrane with a high ion (proton) conductivity such as fluoride resin ion exchange membrane and, as described above, due to occurrence of water saturation to provide a function of an ion conductive electrolyte, the fuel cell stack 1 is required to be supplied with water and humidified.

In order for the fuel cell stack 1 to generate the electric power output, hydrogen serving as fuel and air serving as oxidizer need to be supplied to the fuel electrode and the air electrode, respectively, and as a mechanism to achieve this end, the fuel/air supply system 2 is provided. The fuel/air supply system 2 is comprised of a fuel supply path 21, to permit supply of hydrogen gas or hydrogen rich gas, and an air supply path 22 to permit supply of air, with the fuel supply path 21 being connected to a fuel supply port of the fuel cell stack 1 while the air supply path 22 is connected to an air supply port of the fuel cell stack 1.

Supplied to the fuel supply path 21 is hydrogen that is delivered from a hydrogen tank, not shown, and reduced in pressure by a pressure reduction valve whereupon hydrogen is further controlled in pressure, by a pressure control valve controlled by a control unit such as a micro computer, to a desired pressure to comply with an operating condition.

Meanwhile, the humidifier 3 serves to humidify at least any one of the solid polymer electrolyte of the fuel cell stack 1, hydrogen, serving as fuel, and air and is comprised of a humidification water supply path 31 to supply humidification water, a water recovery path 32 for recovering excessive water, a water storage tank 33 that stores humidification water, and a water pump 34 that draws water from the water tank 33. Water in the water storage tank 33 is sucked by the water pump 34 and supplied through the humidification water supply path 31 to the fuel cell stack 1 to humidify the same, with excessive water being recycled to the water storage tank 33 via the water recovery path 32. Also, without allowing humidification water to be directly supplied to the fuel cell stack 1, a humidifier for humidifying gas (hydrogen rich gas and air) to be supplied to the fuel cell stack 1 may be used to supply humidification water to the fuel cell stack 1.

Mounted to an inlet of the humidification water supply path 31 is a strainer 35 that prevents entry of extraneous objects. Also, the water storage tank 33 is formed with a heat transfer surface such as fins to prevent stored water from being frozen in a manner as will be described later in detail.

Further, the fuel cell stack 1 of a solid polymer electrolyte type has an appropriate operating temperature that remains at a relatively low level of approximately 60° C. to 100° C. and needs to be cooled when excessively heated. Therefore, with the electric vehicle fuel cell power generation system, the cooler 4 is provided for cooling the fuel cell stack 1. The cooler 4 includes the circulation path 41 to allow antifreeze solution (liquid with a freezing point lower than pure water), serving as coolant, to cool the fuel cell stack 1 to maintain the same at an optimum temperature. Also, as coolant, other medium may be used instead of antifreeze solution set forth above but, in consideration of a probability of the fuel cell stack 1 being used in a cold district, it is preferable to employ antifreeze solution with a low freezing point.

Disposed in the circulation path 41 of the cooler 4 is a radiator 42 that cools coolant which has been heated through cooling of the fuel cell stack 1. Also, disposed in parallel to the radiator 42 in a way to communicate with a heat exchanger 43 is a branch path 44 that, if a need arises to heat the fuel cell stack 1 to the appropriate temperature during cold start-up in a cold district, allows antifreeze solution to the heat exchanger 43 upon operations of flow change-over valves A, B to heat the same with heated antifreeze solution being supplied to the fuel cell stack 1. Accordingly, in such case, antifreeze solution serves as hot medium. Moreover, the circulation path 41 is also connected to a hot medium flow passage to heat the heat transfer surface formed on the water storage tank 33 of the humidifier 3 and, during cold start-up in the cold district, heated antifreeze solution is used as hot medium to thaw water in the water storage tank 33.

The heat exchanger 43 takes a hydrogen combustor 45 as a heat source and, as fuel of the hydrogen combustor 45, hydrogen gas (hydrogen rich gas) and air of the fuel/air supply system 2 are utilized. That is, disposed in midways of the fuel supply path 21 and the air supply path 22 of the fuel/air supply system 2 stated above, respectively, are flow change-over valves 46, 47 from which a diverged fuel supply path 48 and a diverged air supply path 49 are connected to the hydrogen combustor 45 mentioned above. Heat of combustion gas resulting from the hydrogen combustor 45 is absorbed in the heat exchanger 43 and, thereafter, combustion gas is exhausted to the outside through path 50.

With the electric vehicle power generation system with such a structure set forth above, during normal traveling, flow ports A1 and A2 of the flow switch-over valve A of the cooler 4 are rendered to communicate one another while flow ports B1 and B2 of the flow switch-over valve B are rendered to communicate one another, thereby forming a circuit to allow antifreeze solution to circulate between the fuel cell stack 1 and the radiator 42. In such case, antifreeze solution functions as coolant and permits heat build up in the fuel cell stack 1 to be heat dissipated in the radiator 42 while adjusting the temperature of the fuel cell stack 1.

Meanwhile, during cold start-up in the cold district, flow ports A1 and A3 of the flow switch-over valve A are rendered to communicate one another while flow ports B1 and B3 of the flow switch-over valve B are rendered to communicate one another, thereby forming a circuit to allow antifreeze solution to circulate between the fuel cell stack 1 and the heat exchanger 43. In such case, hydrogen gas or hydrogen rich gas are supplied from the hydrogen tank, which is not shown, to the hydrogen combustor 45, with resulting combustion gas serving as heating medium to heat antifreeze solution by means of the heat exchanger 43. In such case, antifreeze solution serves as hot medium and passes through the fuel cell stack 1 to heat the same and, subsequently, flows through a hot medium flow passage of the water storage tank 33 to heat water inside the water storage tank 33 to be returned to the heat exchanger 43. As far as hydrogen gas or hydrogen rich gas are supplied to the hydrogen combustor 45, antifreeze solution is heated, with heated antifreeze solution flowing through hot medium flow passages of the fuel cell stack 1 and the water storage tank 33 which are in turn heated. When this takes place, if water in the water storage tank 33 is frozen, heating by antifreeze solution thaws water in the water storage tank 33. Then, water thawed by antifreeze solution is supplied to the fuel cell stack 1 through the humidification water supply path 31 connected to the water pump 34 and utilized for humidifying the fuel cell stack 1.

By the way, in order to realize smooth start-up during cold start-up set forth above, a thawing performance of antifreeze solution serving an hot medium plays an extremely important role. That is, as the thawing performance is high, frozen water can be rapidly thawed even with the water storage tank 33 that is miniaturized, resulting in a capability of achieving smooth start-up. With the presently filed embodiment, the water storage tank 33 is formed with the heat transfer surface, thereby realizing efficient thawing. Hereinafter, a concrete structure of a thawing mechanism provided in the water storage tank 33 is described.

Figure 2:
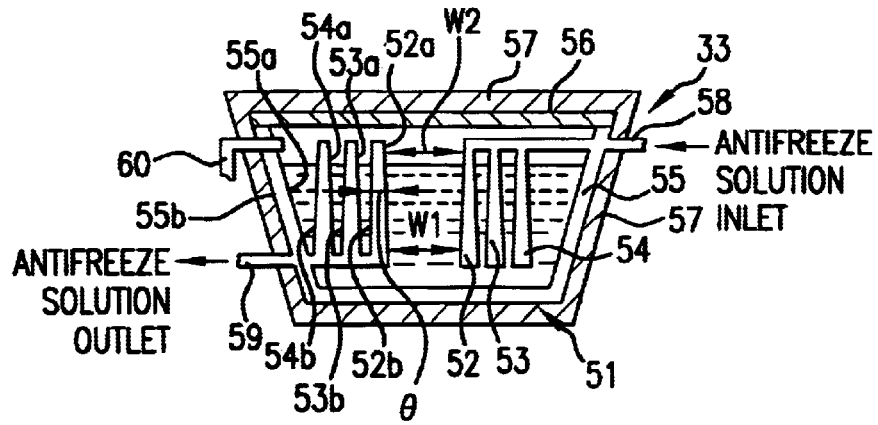
FIG. 2 is a schematic cross sectional view illustrating an example of a thawing mechanism disposed in a water storage tank.
Figure 3:
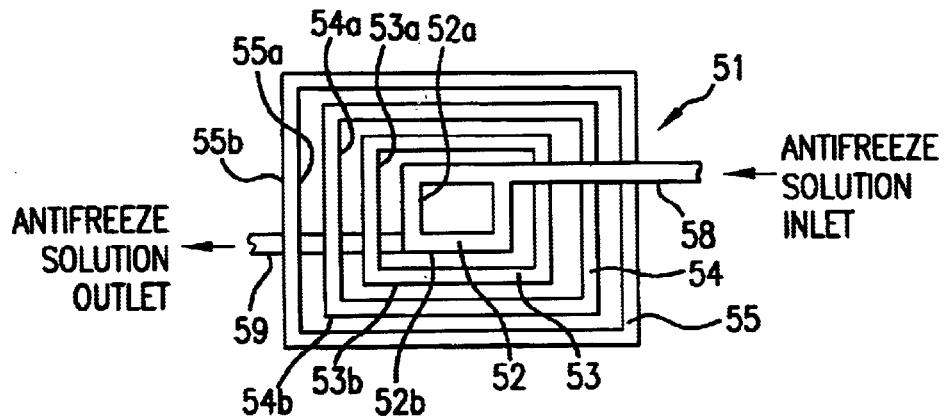
FIG. 3 is a plan view of a heat dissipation plate.

As shown in FIGS. 2 and 3, the water storage tank 33 incorporates therein a heat dissipation unit 51 that internally has the hot medium flow passage and is arranged such that admitting antifreeze solution serving as hot medium through the heat dissipation unit 51 allows water (ice) in the water storage tank 33 to be heated. The heat dissipating unit 51 has a plurality of frame-like heat transfer plates that are rectangular in plane shapes and, in this exemplary case, the heat dissipating plates 52, 53, 54, 55 with a difference in size are arrayed in a quartet state. Among these, the outermost heat dissipation plate 55 doubles as an outer peripheral vessel of the water storage tank 33, with its upper surface being closed by a lid member 56 while, further, having a circumference surrounded by a heat insulation material 57. Further, although an air bleeder for suppressing increase in an internal pressure, a temperature gage for detecting the water temperature and water level meter for measuring a water amount are mounted in the water storage tank 33, these component parts are herein omitted.

Connected to one part of upper end portions of the respective heat dissipation plates 52, 53, 54, 55 forming the heat dissipation unit 51 is a hot medium intake port 58, connected to the circulation path 41 of the cooler 4, through which antifreeze solution serving as hot medium is admitted to the hot medium flow passages of the respective heat dissipation plates 52, 53, 54, 55. Similarly, connected to one part of bottom surface portions of the respective heat dissipation plates 52, 53, 54, 55 is a hot medium exhaust port 59, connected to a downstream side of the circulation path 41, that serves as an outlet through which antifreeze solution admitted through the hot medium flow passages is returned to the circulation path 41.

With the heat dissipation unit 51 with such a structure set forth above, due to introduction of antifreeze solution through the hot medium flow passages, inner peripheral surfaces 52a, 53a, 54a, 55a and outer peripheral surfaces 52b, 53b, 54b, 55b of the respective heat dissipation plates 52, 53, 54, 55 function as the heat transfer surfaces. Then, due to an ability of heat being transferred from antifreeze solution to water (ice) in the water storage tank 33 by means of these heat transfer surfaces, water (ice) in the water storage tank 33 is heated and thawed.

Figure 4:
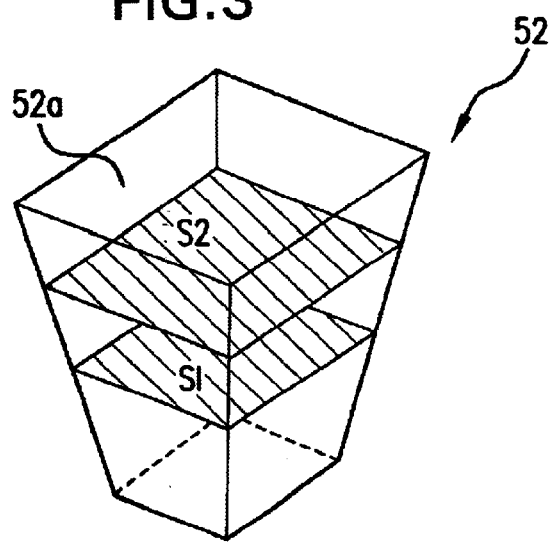
FIG. 4 is a typical view illustrating how a surface area of a water surface increases followed by an increase in a water level.

Here, the respective heat transfer surfaces, that is, the inner peripheral surfaces 52a, 53a, 54a, 55a and the outer peripheral surfaces 52b, 53b, 54b, 55b of the respective heat dissipation plates 52, 53, 54, 55 have surface areas, exposed to a water surface surrounded by these heat transfer surfaces, which have respective inclined angles that gradually increase with an increase in a water level. To describe the innermost heat dissipation plate 52 as an example, its inner peripheral surface 52a is inclined at an inclination angle θ(see FIG. 2) to allow a spacing between mutually opposing surfaces to expand upward. Then, comparison between a spacing W1 closer to the bottom portion and a spacing W2 closer to an upper end portion provides a formula W1<W2 (see FIG. 2). This similarly results in a spacing between surfaces mutually opposing right and left and a spacing between surfaces mutually opposing up and down. Accordingly, as viewed in FIG. 4, the surface area of the water surface surrounded by the inner peripheral surface 52a of the heat dissipation plate 52 increases with an increase in the water surface (or a surface of ice) and a surface area S2 of the water surface at a high water level is greater than a surface area S1 of the water surface at a low water level.

The above-described relationship may be similarly applied to spacing between other heat dissipation surfaces and, more particularly, the respective heat dissipation surfaces are so inclined as to allow the spacing between the opposing surfaces to progressively expand as the spacing goes upward even in the relationships between the outer peripheral surface 52b of the heat dissipation plate 52 and the inner peripheral surface 53a of the heat dissipation plate 53, between the outer peripheral surface 53b of the heat dissipation plate 53 and the inner peripheral surface 54a of the heat dissipation plate 54 and between the outer peripheral surface 54b of the heat dissipation plate 54 and the inner peripheral surface 55a of the heat dissipation plate 55. This results in a structure wherein any water surface surrounded by any heat dissipation surfaces increase with an increase in the water level.

Further, the water storage tank 33 is formed with a drain 60 for pure water at a position to allow upper ends of the heat dissipation plates 52, 53, 54, 55, that is, the position of the upper ends of the respective heat dissipation surfaces, to be higher than a storage water upper limit ion the water storage tank 33.

The thawing mechanism of the water storage tank 33 with such a structure stated above has advantages as will be described later. First, a widened heat transfer surface (involving an inner side wall of the tank and a heat dissipation surface of the tank) can be enhanced without need for enlarging the tank and frozen pure water is efficiently heated to be thawed. Further, the heater doubles as means for achieving warm-up promotion of the fuel cell stack 1 and thawing of ice in the water storage tank 33, thereby enabling cost up to be suppressed. Additionally, the use of coolant of the fuel cell stack 1 as hot medium for the water storage means provides no need for providing a specific hot medium circulation device and, form this respect, cost up can be further suppressed. Besides, the use of the hydrogen combustor 45 as the heater means allows an electric power, required for start-up of the fuel cell stack 1, to be suffice to be less than that required when using an electric heater and, therefore, in a case where the fuel cell stack 1 is installed in a vehicle, thereby enabling a start-up secondary battery from being large-sized.

Secondly, during freezing, although it is feared that an interior of water begins to freeze, after the upper surface has been frozen (due to a specific weight of ice lower than that of water), followed by resulting volumetric expansion to result in an acting force by which deformation and cracks occur in the heat transfer surfaces, due to the structure in which the heat dissipation surfaces are formed at the inclination angles to allow the surface areas of the water storage portions to expand upward with an increase in height of the upper portions, the surfaces of ice are separated from the heat dissipation surfaces when subjected to volumetric expansion of ice, thereby enabling the acting force exerted to the heat dissipation surfaces to be alleviated. Looking from the surface of ice, no acting force is imparted to the surface of ice from the heat dissipation surfaces, and the surface of ice can be easily raised.

Figure 5A:
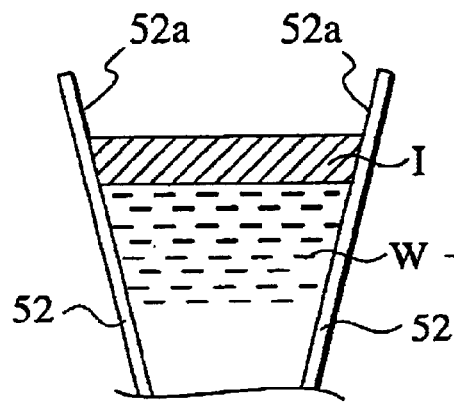
FIGS. 5A and 5B are typical views illustrating circumstances during a freezing state.
Figure 5B:
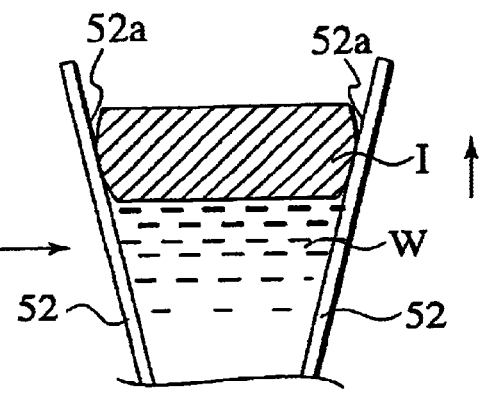

FIGS. 5A and 5B are views illustrating phenomenon of water surfaces surrounded by the inner peripheral surface 52a of the innermost heat dissipation plate 52. As viewed in FIG. 5A, when the temperature drops and water W begins to freeze, water in close proximity to the upper surface thereof initially freezes to form ice I. As freezing further proceeds, water W beneath the ice I begins to freeze and, due to resultant volumetric expansion during such freezing, a force that cause ice to expand outward in a horizontal direction is converted to a force that causes ice to move upward owing to the inclination of the inner peripheral surface 52a of the heat dissipation plate 52, resulting in the surface of the ice I being raised. When this takes place, at a height in which the surface of the ice I that is positioned, since the surface area surrounded by the inner peripheral surface 52a of the heat dissipation plate 52 is widened, the ice I that has a smaller surface area than that of the associated inner peripheral surface 52a is separated from the inner peripheral surface 52a that forms the heat dissipation surface as shown in FIG. 5B. Accordingly, no acting force of the ice I is imparted to the inner peripheral surface 52a forming the heat dissipation surface and a durability of the heat dissipation surface is highly improved.

Figure 6A:
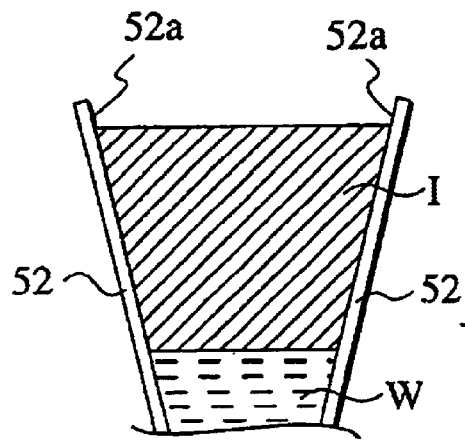
FIGS. 6A and 6B are typical views illustrating circumstances during a thawing state.
Figure 6B:
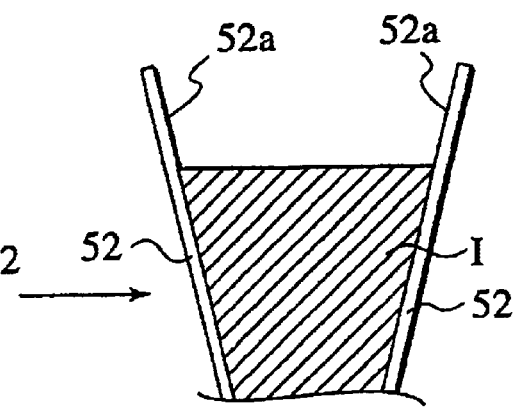

Meanwhile, as shown in FIG. 6A, when the ice I progressively becomes small in size, because of the heat dissipation surface having the inclination angle, as shown in FIG. 6B, a position of the ice I is lowered with a decrease in the water level while permitting side surfaces of the ice I to be continuously kept in contact with the inner peripheral surface 52a serving as the heat dissipation surface. Consequently, a time interval in which the ice I is held in contact with the heat dissipation surface is prolonged, thereby achieving an efficient thawing.

Thirdly, due to the heat dissipation surface, that is provided internally of the water storage tank, having an upper end higher than the water surface (the surface of the ice), it is possible to prevent the ice from being only internally thawed to form a cavity in which air with low heat conductivity intervenes to cause deterioration in a thawing performance. To describe respective heat conductive rates {W/m/K} for reference, these are expressed as ice=2.6, water (0° C.) and air (0° C.)=0.024.

(Second Embodiment)

This embodiment represents a modified example of a shape of the heat dissipation unit 51 disposed in the water storage tank 33. A fundamental structure of the electric vehicle power generation system is similar to that shown in FIG. 1 set forth above.

Figure 7:
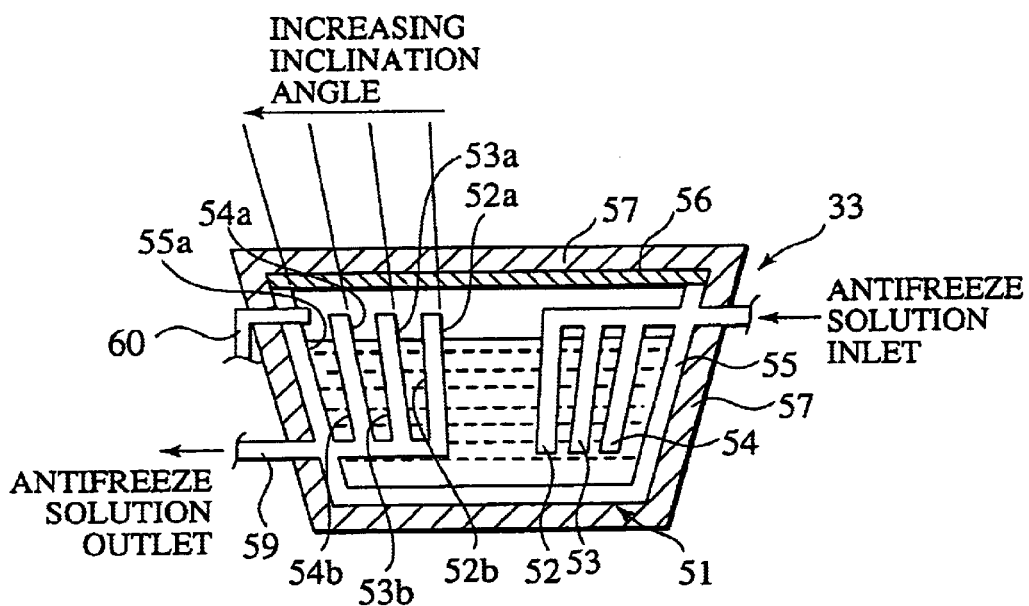
FIG. 7 is a schematic cross sectional view showing a modified form of a heat dissipation plate.
Figure 8:
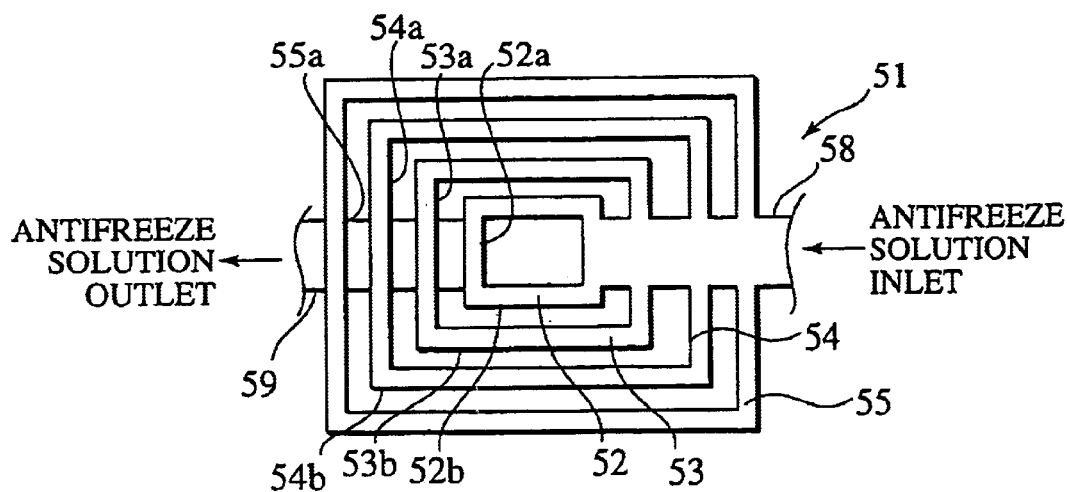
FIG. 8 is a plan view showing the modified form of the heat dissipation plate.

With this embodiment, as shown in FIGS. 7 and 8, the inner peripheral surfaces or the outer peripheral surfaces (heat dissipation surfaces) of the respective heat dissipation plates 52, 53, 54, 55 of the heat dissipation unit 51 disposed in the water storage tank 33 are configured such that the inclination angle increases as the heat dissipation surface is disposed closer to an outer side of the water storage tank 33. More particularly, the arrangement is such that the inner peripheral surface 54a of the heat dissipation plate 54 has a larger inclination angle than that of the inner peripheral surface 53a of the heat dissipation plate 53 and the inner peripheral surface 55a of the heat dissipation plate 55 has a larger inclination angle than that of the inner peripheral surface 54a of the heat dissipation plate 54. Even in the presence of the heat dissipation unit 51 configured in such a structure, the water surface between the respective heat dissipation surfaces has the surface area that expands with an increase in the water level.

As a result, even the presently filed embodiment has the same effects as those of the first embodiment. Further, with the presently filed embodiment, the inclination angle increases as the heat dissipation surface is disposed closer to the outer side of the water storage tank 33, with a resultant effect of protecting the outer periphery or the heat dissipation surfaces of the water storage tank from being deformed or cracked. In addition, due to a capability of minimizing a volume of the hot medium flow passages between the heat dissipation surfaces disposed in the water storage tank 33, a pure water storage efficiency (=amount of pure water/external volume of tank) can be increased, thereby enabling the water storage tank 33 to be miniaturized in a smaller size than that stores the same amount of water.

(Third Embodiment)

This embodiment represents a structure that includes a water circulation system for circulating water of the water storage tank 33. A fundamental structure of the electric vehicle power generation system is similar to that shown in FIG. 1 set forth above.

Figure 9:
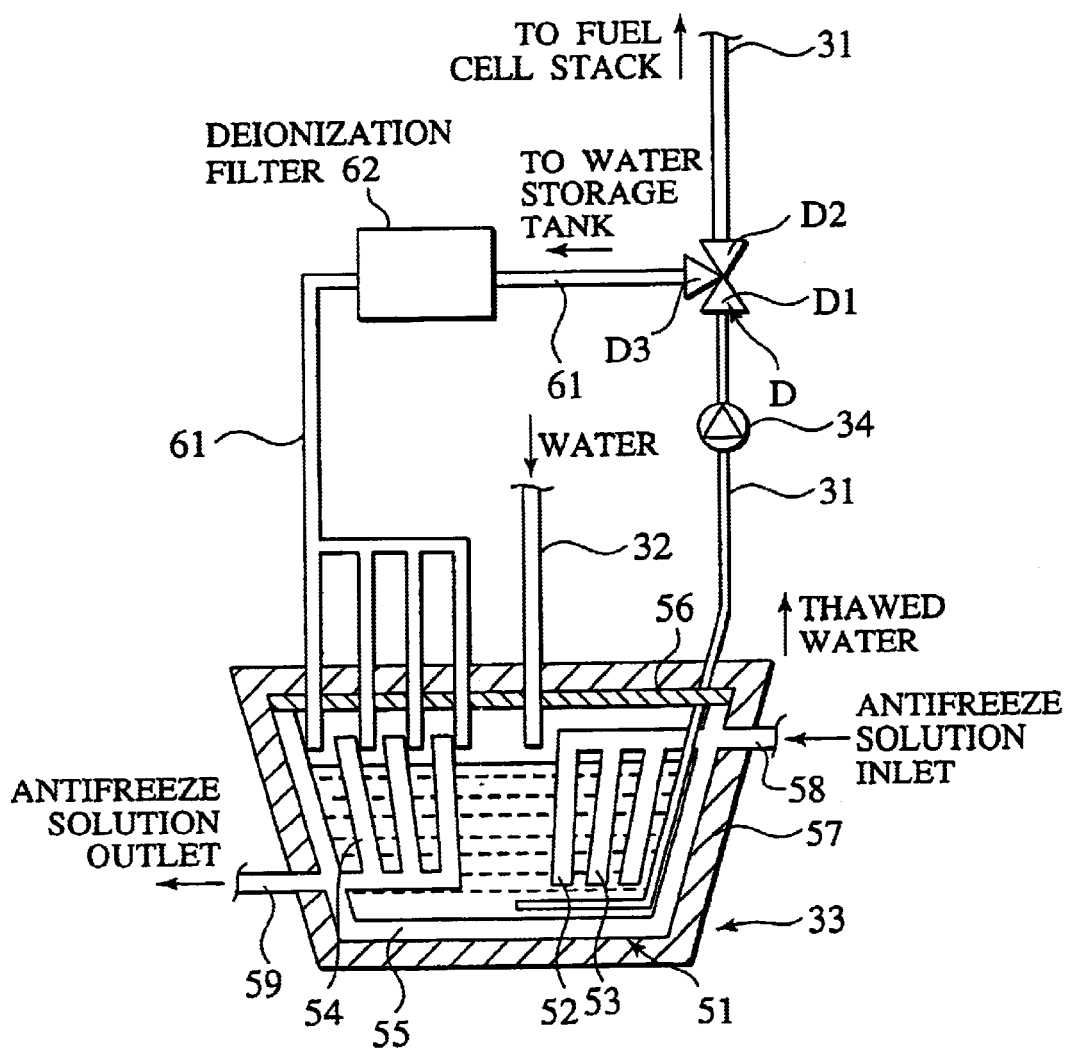
FIG. 9 is a typical view illustrating an example of a water circulation system.

With the presently filed embodiment, as shown in FIG. 9, disposed in a humidification water supply path 31 downstream of the water pump 34 is a valve D, from which a circulation path 61 is diverged. The circulation path 61 serves to allow thawed water, sucked by the water pump 34, to be returned to the water storage tank 33 and has its midway provided with a deionization filter 62.

Thus, the presently filed embodiment is configured such that the water circulation system draws thawed water through the water pump 34, whose water intake port is located near the bottom wall, and supplies the same to the water storage tank 33 again and an object of thawed water to be delivered is changed over by the valve D. In particular, when supplying pure water to the fuel cell stack 1, ports D1 and D2 communicate one another and, when returning thawed water to the water storage tank 33, ports D1 and D3 communicate one another. Due to the presence of the deionization filter 62 disposed in the midway of the circulation path, excessive ions in thawed water to be returned to the water storage tank 33 are removed by the deionization filter 62 to cause a decrease in an electric conductivity.

From the foregoing description, it appears that the presently filed embodiment has the following advantages. First, removing excessive thawed water from the water storage tank 33 increases an contact area between the heat dissipation surfaces of the heat dissipation unit 51, disposed in the water storage tank 33, and the ice, thereby promoting the thawing effect. Further, due to an ability of circulated water being supplied to the water storage tank 33 along the heat dissipation surfaces, convection occurs in thawed water, thereby enabling heat transfer between the heat dissipation surface and thawed water to be promoted. Additionally, circulating thawed water through the circulation path 61 equipped with the deionization filter 62 enables the pure water conductivity, even after a halt for a long time period, to be decreased prior to being supplied to the fuel cell stack 1.

(Fourth Embodiment)

This embodiment utilizes heat of combustion gas exhausted from the hydrogen combustor not only for heating antifreeze solution but for thawing.

Figure 10:
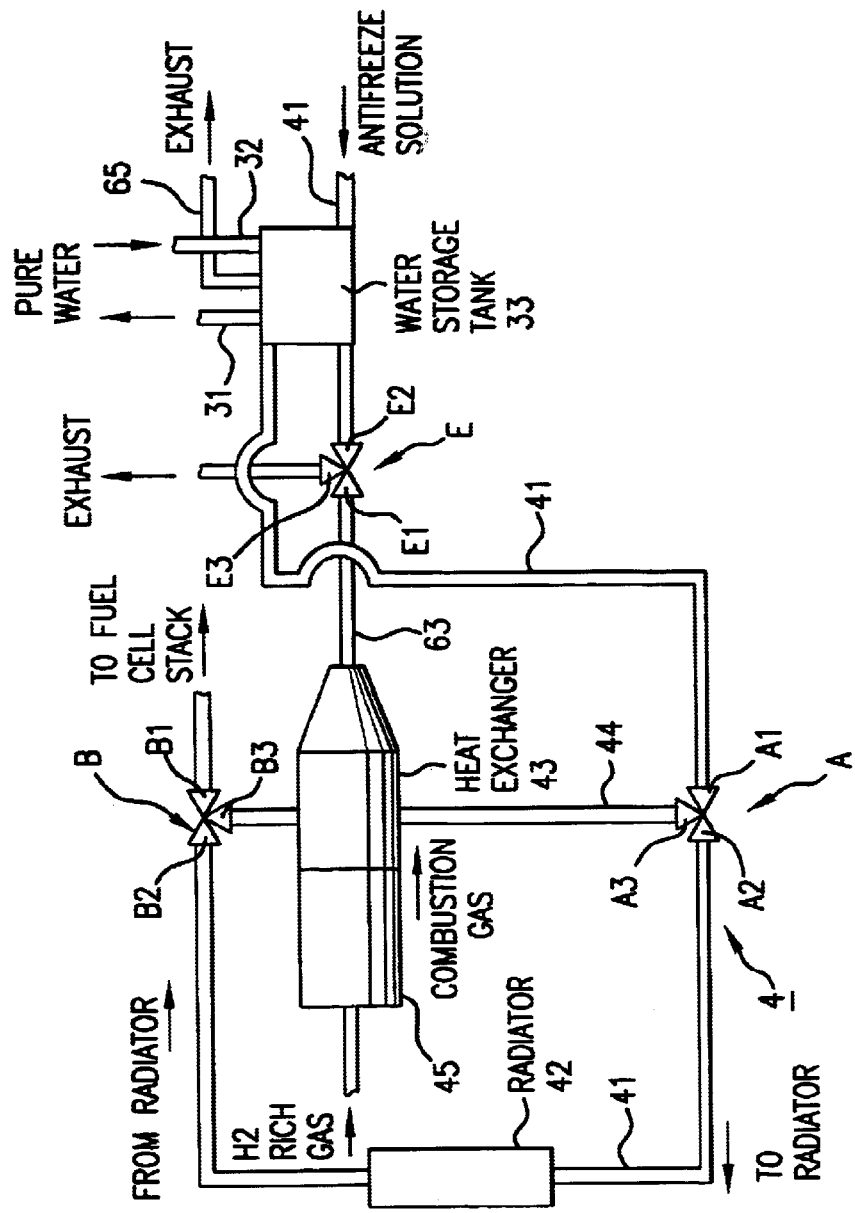
FIG. 10 is an overall structural view illustrating a circuit structure in a case where combustion exhaust gas is combined in use.
Figure 11:
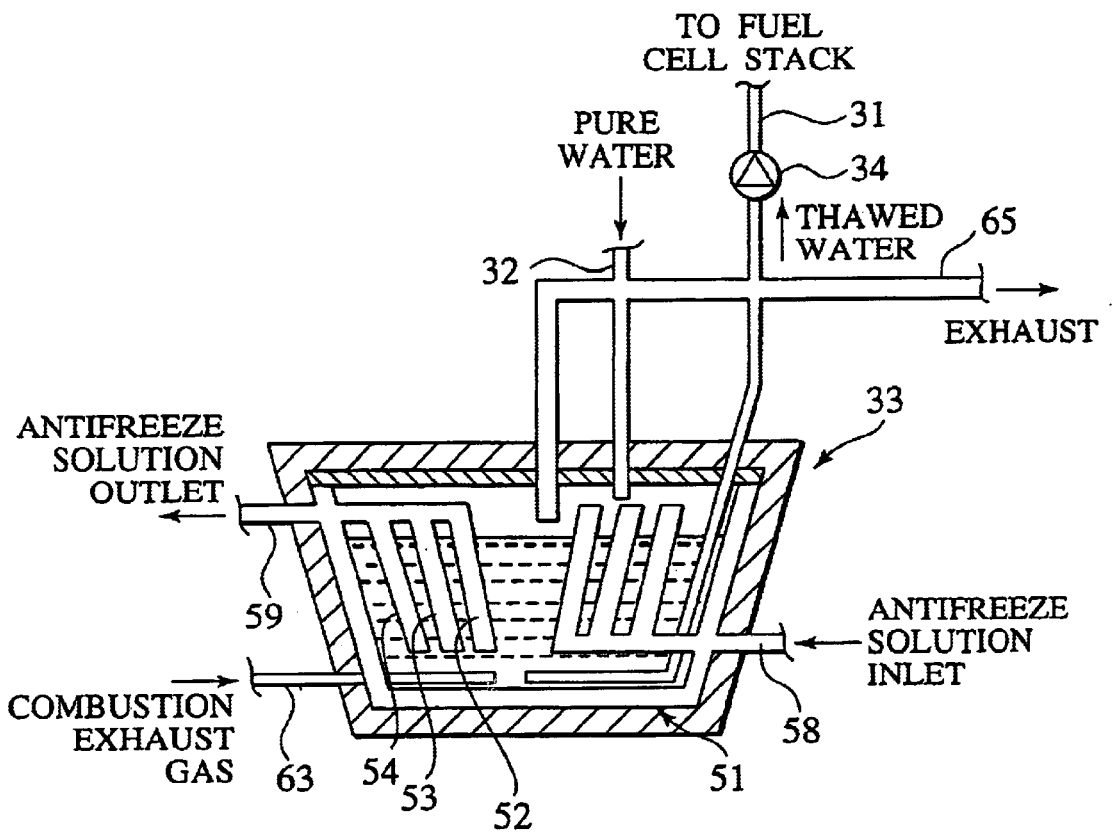
FIG. 11 is a schematic cross sectional view illustrating a structure of a water storage tank in which combustion exhaust gas is introduced.
Figure 12:
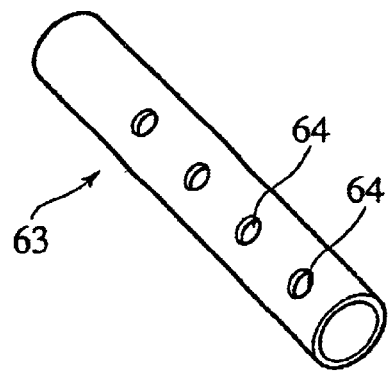
FIG. 12 is a perspective view illustrating an end portion of an exhaust pipe inserted through the water storage tank.

With the presently filed embodiment, as shown in FIGS. 10 and 11, an exhaust pipe 63 for expelling combustion gas from the hydrogen combustor 45 is introduced into the water storage tank 33. Disposed in a midway of the exhaust pipe 63 is a valve E by which combustion exhaust gas to be delivered is switched over between an inlet of the water storage tank 33 and an exhaust side. Formed in an end portion of the exhaust pipe, to be introduced into the water storage tank 33, at given intervals are exhaust ports 64 as viewed in FIG. 12, with the end portion being inserted through the bottom portion of the water storage tank 33. Further, disposed on an upper portion of the water storage tank 33 is a deaerator pipe 65 that extends from a spacing above the water surface to allow combustion exhaust gas, that has been bubbled, to be rapidly expelled from the deaerator pipe 65.

With the circuit structure set forth above, combustion exhaust gas expelled from the heat exchanger 43 is exhausted to the outside of the vehicle via the valve E or exhausted to the outside of the vehicle via the water storage tank 33. An operative condition of the valve E broadly involves a first status (to provide communication between the ports E1 and E2) during heating of the water storage tank and a second status (to provide communication between the ports E1 and E3) during non-heating of the water storage tank. During heating of the water storage tank 33, combustion exhaust gas expelled from the heat exchanger 3 is bubbled in the water storage tank 33 through the ports E1 and E2 and subsequently exhausted to the outside of the vehicle. During non-heating of the water storage tank 33, combustion exhaust gas expelled from the heat exchanger 3 is exhausted in situ to the outside of the vehicle through the ports E1 and E3.

With the presently filed embodiment, the heat value of combustion exhaust gas and heating of antifreeze solution are combined in use, resulting in a further improvement in a thawing efficiency. Also, convection occurs in thawed water due to bubbling of combustion exhaust gas, thereby enabling thawing to be promoted.

While the present invention has been described with reference to the various embodiments, the present invention is not limited to these embodiments and various modifications may be made. In the various embodiments described above, although the heat transfer surfaces provided in the water storage tank 33 take the form of a rectangular shape in order for the external volume of the water storage tank 33 to be suppressed from being increased while increasing the transfer surfaces, the heat transfer surfaces may take any other shape such as a polygonal shape or other contoured shape conformed in consideration of a mounting capabilities of various sensors disposed in the water storage tank 33. Also, only one of a pair of the opposing heat transfer surfaces may be configured to have an inclination angle.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. A fuel cell system comprising:
   a fuel cell;
   a fuel cell humidifier having a water storage section that stores water to humidify the fuel cell; and
   a heat transfer surface disposed in the water storage section and heated by hot medium supplied to a hot medium flow passage; wherein
   the heat transfer surface having an inclination angle that allows a surface area of a water level surrounded by the heat transfer surface to progressively increase with an increase in a water level.

2. The fuel cell system according to claim 1, further comprising:
   a cooler for cooling the fuel cell, wherein coolant medium of the cooler is heated and used as the hot medium.

3. The fuel cell system according to claim 2, wherein the coolant medium is antifreeze solution.

4. The fuel cell system according to claim 1, wherein an upper end of the heat transfer surface is preset to higher than an upper limit of a water storage surface of the water storage section.

5. The fuel cell system according to claim 1, wherein the inclination angle of the heat transfer surface is larger as the heat transfer surface is disposed to be closer to an outside of the water storage section.

6. The fuel cell system according to claim 1, wherein the fuel cell humidifier has a water circulation system that allows water to be circulated in the water storage section.

7. The fuel cell system according to claim 6, wherein the water circulation system includes a circulation path in which a deionization filter is disposed.

8. The fuel cell system according to claim 2, further comprising:
   a combustor combusting a portion of fuel of the fuel cell, wherein the combustor is used as a heater for heating the coolant medium.

9. The fuel cell system according to claim 8, further comprising:
   an exhaust gas introducing unit for introducing exhaust gas from the combustor into the water storage section.

10. A fuel cell system comprising:
    a fuel cell;
    fuel cell humidifying means having a water storage section that stores water to humidify the fuel cell; and
    heat transfer means disposed in the water storage section and heated by hot medium supplied to a hot medium flow passage; wherein the heat transfer means having an inclination angle that allows a surface area of a water level surrounded by the heat transfer means to progressively increase with an increase in a water level .

11. A method of operating a fuel cell system, the method comprising:

preparing a fuel cell;

preparing a fuel cell humidifier having a water storage section that stores water;

preparing a hot medium flow passage formed with a heat transfer surface, disposed in the water storage section, which has an inclination angle that allows a surface area of a water level surrounded by the heat transfer surface to progressively increase with an increase in a water level;

supplying hot medium through the hot medium flow passage and heating the water in the water storage section; and humidifying the fuel cell using the water heated by the heat transfer surface; and supplying fuel and oxidizer to the fuel cell to allow the fuel cell to generate an electric power output in the presence of the water supplied thereto in the humidifying step.

* * * * *